Sept. 25, 1956     G. P. FLEISCHMAN     2,764,260
VIBRATION DAMPENING MEANS FOR BRAKES, CLUTCHES, AND THE LIKE
Filed Jan. 26, 1952     2 Sheets—Sheet 1

INVENTOR.
George P. Fleischman
BY
Willits, Helmig & Caillio
ATTORNEYS

Sept. 25, 1956  G. P. FLEISCHMAN  2,764,260
VIBRATION DAMPENING MEANS FOR BRAKES, CLUTCHES, AND THE LIKE
Filed Jan. 26, 1952  2 Sheets-Sheet 2

INVENTOR.
George P. Fleischman
BY
Willits, Helwig & Baillio
ATTORNEYS

United States Patent Office 2,764,260
Patented Sept. 25, 1956

2,764,260

VIBRATION DAMPENING MEANS FOR BRAKES, CLUTCHES, AND THE LIKE

George P. Fleischman, Indianapolis, Ind., assignor to General Motors Corporation, Detroit, Mich., a corporation of Delaware Application January 26, 1952, Serial No. 268,420

2 Claims. (Cl. 188—1)

This invention relates to brakes and clutches, and more particularly to means associated with such devices for minimizing or preventing vibrations therein.

In brake mechanisms, as for example those associated with army tanks, tractors, and the like, owing to the rugged construction thereof and also to the severe conditions under which such vehicles operate, rapid vibrations at times are set up in the friction plates associated with the brakes thereof. As a result of these vibrations, sharp vibratory impacts are imparted to the friction plates when the brakes are applied causing severe damage to said plates and often rendering the brakes inoperative.

One object of the present invention is to provide a novel and highly useful means for minimizing or preventing vibrations in the friction plates associated with brakes or clutches.

Another object is to provide a novel means for minimizing or preventing vibrations in brakes or clutches associated with army tanks, tractors, and similar vehicles which customarily operate under adverse conditions.

A more specific object is to provide means for minimizing or preventing vibration in brakes or clutches of the stated character consisting of the provision of a wire or similar means in a peripheral groove provided in each of the friction discs associated with the rotating members thereof.

A still further object is to provide in a brake or clutch mechanism novel and highly improved means for minimizing or preventing vibration therein which is simple in construction, economic in manufacture, and durable in operation.

Other and further objects will become apparent as the description of the invention progresses.

Figure 1:
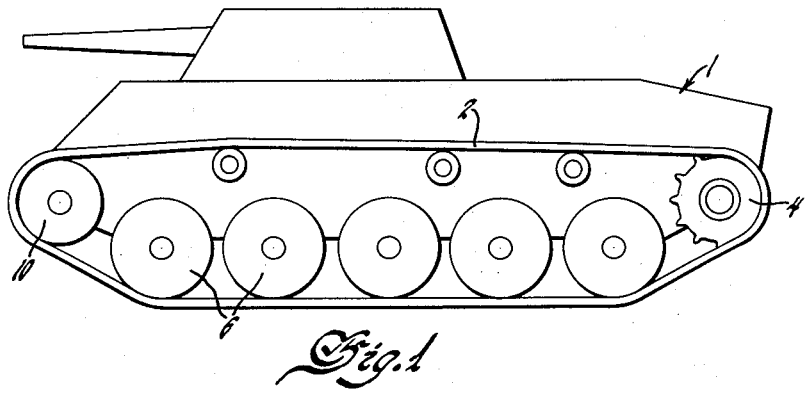
Fig. 1 is a side elevational view of any army tank showing one of endless tracks thereof and the operating parts associated therewith.
Figure 2:
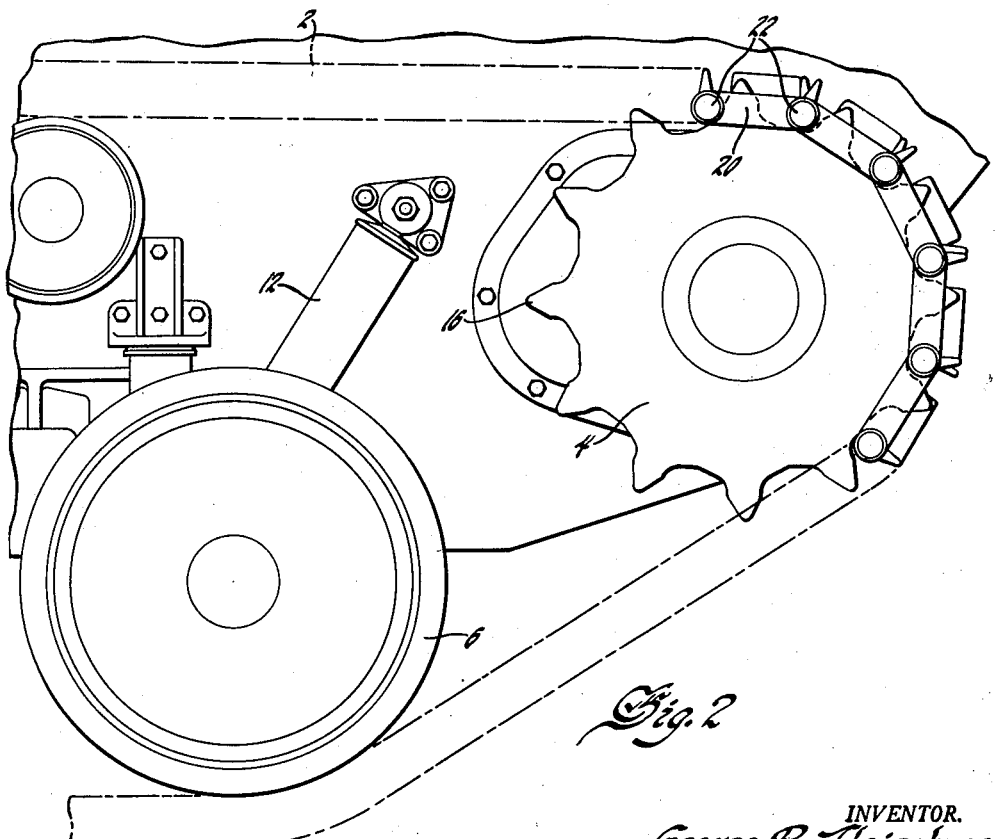
Fig. 2 is a fragmentary side elevational view of a portion of the tank showing the structure of the driving mechanism for one of the endless tracks associated therewith.
Figure 3:
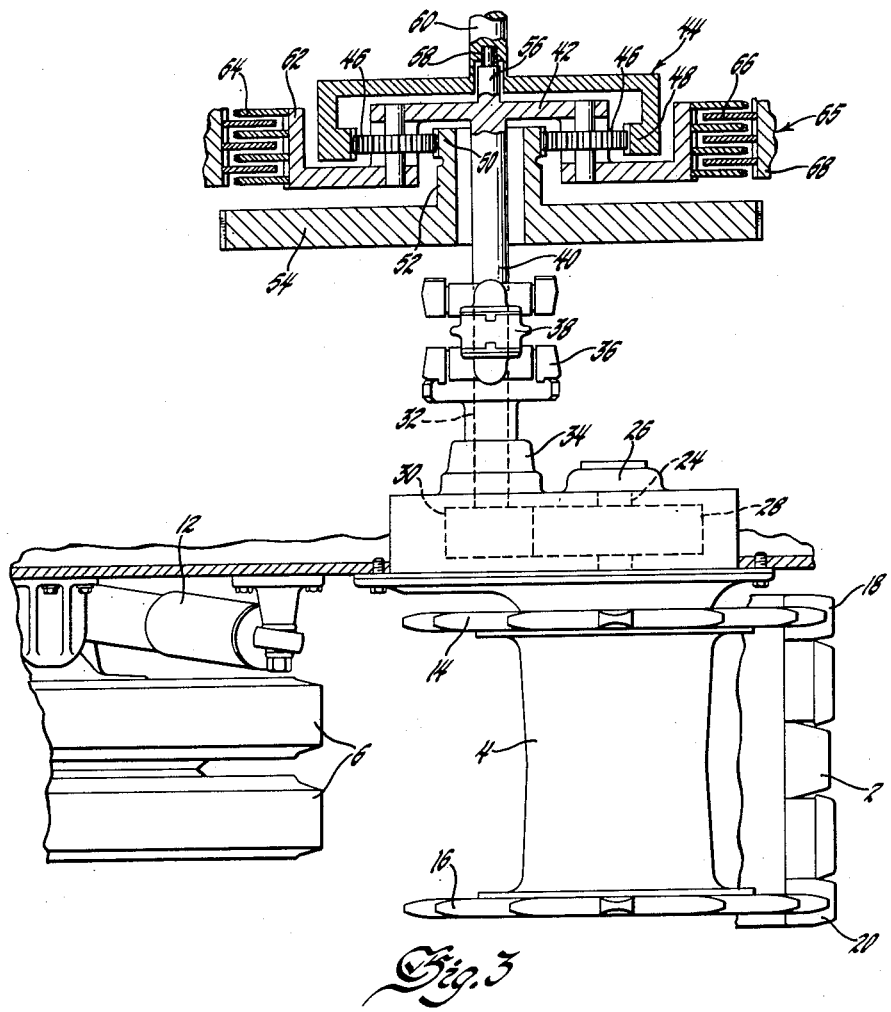
Fig. 3 is a plan view, partly in section, showing the driving mechanism for one of the endless tracks of the tank shown in Fig. 1, and a portion of the transmission mechanism and the service brake associated therewith.

Referring to the drawings, the numeral 1 designates generally an army tank having the usual endless tracks 2 at either side thereof, only one of the latter of which being shown. Track 2 is driven by a sprocket 4 disposed near one end of the tank and is also trained over a series of supporting and propelling wheels 6 and a guide pulley 10 disposed at the other end of said tank. The suspension for the wheels 6 of tank 1 is of usual construction and includes shock absorbers 12, as shown in Figs. 2 and 3. Sprocket 4 is provided with sprocket teeth 14 and 16 at each end thereof which engage the chain portions 18 and 20, respectively, provided at the opposite sides of track 2. For a forward movement of the tank 1 sprocket 4 is rotated in a counterclockwise direction (Figs. 1 and 2) causing the teeth 14 and 16 to successively engage the pins 22 connecting the chain links 18 and 20 in a well known fashion. To reverse the operation of tank 1 sprocket 4 is actuated in a clockwise direction (Figs. 1 and 2). During operation of tanks of this character during army maneuvers, or when engaged in battle, it frequently occurs that the tanks must be suddenly stopped and immediately thrown in reverse and then conditioned for forward movement again. Such maneuvers often occur over a rough terrain which creates jars and shocks to the operating parts thereof. These shocks and jars imparted to the track 2 are conducted by the operating connections to the transmission mechanism and also to the brakes and other parts of the structure thereby causing rapid vibrations to occur therein.

Sprocket 4 is mounted on a shaft 24 journalled in any suitable bearings 26 and has a relatively large gear 28 secured to one end thereof. Gear 28 meshes with a smaller gear 30 secured to one end of a shaft 32 journalled in any suitable bearings 34 and 36. Shaft 32 is coupled by means of a coupling 38 to the outer end of a drive shaft 40. The other end of a shaft 40 is secured in any suitable manner to a carrier 42 associated with a planetary gear transmission indicated generally by the numeral 44. Carrier 42 has rotatably mounted at spaced points thereon a plurality of planet gears 46 which mesh with a ring gear 48 and also with a gear 50 both of which being mounted coaxially with shaft 40. The hub 52 of gear 50 has secured thereto a large gear 54 which in turn may be connected by gearing to operating mechanism (not shown), and constitutes the driving gear for the gearing associated with sprocket 4. The innermost reduced portion 56 of shaft 40 is mounted in any suitable bearings 58 provided in a shaft 60 secured to ring gear 48.

Carrier 42 is provided with a splined drum portion 62 having a series of annular friction plates 64 of a friction brake 65 secured in spaced relation thereon. Disposed between friction plates 64 is a second series of friction plates 66 secured to the splined inner periphery of a nonrotatable member 68 of brake 65. By relative axial movement of carrier 42 and brake member 68 the annular friction plates 64 and 66 are brought into frictional contact with each other thereby braking the movement of carrier 42. The transmission mechanism for actuating sprocket 4 thus far described is shown and described in the copending application of John E. Storer, Jr., et al., Serial No. 178,912, filed August 11, 1950, for Steering Drive for Vehicle Transmission, now Patent No. 2,689,488, and to which reference may be had for a complete disclosure of the transmission mechanism as a whole.

Figure 4:
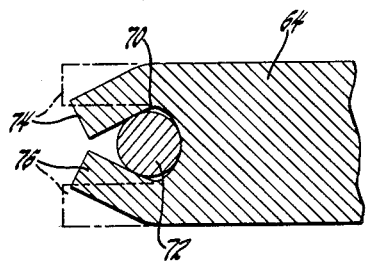
Fig. 4 is a fragmentary sectional view taken through one of the friction plates associated with the brake mechanism shown in Fig. 3.

The present invention is concerned more with means for minimizing or preventing vibrations that occur in the friction plates 64 as a result of the operating conditions hereinbefore described. Referring more particularly to Figs. 3 and 4, each plate 64 is provided with an annular groove 70 around the periphery thereof. A wire 72 is inserted in groove 70 and extends therearound. After the wire 72 has been inserted in place, the walls 74 and 76 of groove 70 are crimped inwardly into engagement with said wire, as shown in Fig. 4 thereby firmly retaining said wire in position. The groove 70 before crimping of the ends thereof is shown by broken lines in Fig. 4. By mounting a wire 72 on the friction plates 64 in this manner, the tendency thereof to vibrate is materially reduced. This is due to the close proximity of the wires 72 to the side walls and bottom of annular grooves 70 since the vibratory impulses of these parts must strike the wires and thus are dampened if not fully absorbed thereby. These impacts on the wires set up vibrations in the latter which also operate to neutralize the vibrations of the plates 64. The wires 72 also being mounted near the portions of the plates 64 where the amplitude of vibration is greatest will be subjected to tension when vibratory distortions occur and consequently resist the formation of such distortions. There is also some sliding or wiping contact between the wires 72 and the walls and bottom of the grooves 70 when vibrations occur in the plates 64. As a result the vibrations that ordinarily are set up in the friction plates of brakes due to the causes hereinbefore set forth are minimized, if not altogether eliminated. Consequently, when the brake 65 is applied the plates 64 and 66 will engage without chatter and as a result effective braking not only is assured but damage to the parts is prevented.

From the foregoing description it is seen that a novel and highly useful mechanism has been provided for minimizing or preventing vibrations in the rotating friction plates associated with clutch or brake mechanism. The sharp vibratory impacts which ordinarily occur between the fixed and rotating discs of brake mechanisms are thus eliminated. The life of the brake as a whole thereof is not only considerably increased but efficient and reliable operation of the brake is also assured.

While the illustrative embodiment shows the invention applied to a brake, it will be apparent to those skilled in the art, that vibration dampening means such as that shown herein is equally adaptable for use in connection with clutches. It is also apparent to those skilled in the art that instead of a wire other forms of dampening means may also be employed without departing from the spirit of the invention. It therefore is to be understood that it is not intended to limit the invention to the single embodiment shown but only by the scope of the claims which follow.

What is claimed is:

1. A vibration dampening device for an annular friction plate, comprising a friction plate having an annular groove in its outer periphery, an annular wire vibration dampener mounted in said groove between the side walls thereof, at least one of said side walls of said groove being crimped laterally inwardly into engagement with said wire dampener to retain it in its operative position.

2. In a device of the class described, the combination of spaced annular friction plates, means for mounting said friction paltes for movement into and out of frictional contact with each other, vibration dampening means for certain of said friction plates, said vibration dampening means including an annular groove in the outer periphery of each of said certain friction plates and an annular wire dampener inserted between the side walls of said groove, at least one of the said side walls being crimped laterally inwardly into engagement with said dampener to retain it in its operative position.

References Cited in the file of this patent
UNITED STATES PATENTS

| | | |
|---|---|---|
| 1,423,642 | Beal et al. | July 25, 1922 |
| 1,780,710 | Katwinkel | Nov. 4, 1930 |
| 1,988,967 | Emrick | Jan. 22, 1935 |
| 2,197,583 | Koeppen et al. | Apr. 16, 1940 |
| 2,288,438 | Dach | June 30, 1942 |
| 2,467,980 | Lambert | Apr. 19, 1949 |
| 2,551,253 | Du Bois | May 1, 1951 |